United States Patent [19]

Luckey

[11] 4,032,471

[45] June 28, 1977

[54] PROCESS FOR PREPARING YTTRIUM OXIDE AND RARE EARTH METAL OXIDE PHOSPHORS

[75] Inventor: George W. Luckey, Rochester, N.Y.

[73] Assignee: Eastman Kodak Company, Rochester, N.Y.

[22] Filed: Feb. 11, 1976

[21] Appl. No.: 657,350

Related U.S. Application Data

[63] Continuation-in-part of Ser. No. 544,465, Jan. 27, 1975, abandoned, which is a continuation-in-part of Ser. No. 376,757, July 5, 1973, abandoned.

[52] U.S. Cl. ..................................... 252/301.4 R
[51] Int. Cl.$^2$ ..................................... C09K 11/46
[58] Field of Search ........................... 252/301.4 R

[56] References Cited

UNITED STATES PATENTS

| | | | |
|---|---|---|---|
| 3,449,258 | 6/1969 | Ropp et al. | 252/301.4 R |
| 3,484,381 | 12/1969 | Yale et al. | 252/301.4 R |
| 3,574,130 | 4/1971 | Mathers et al. | 252/301.4 R |
| 3,682,823 | 8/1972 | Hitomi et al. | 252/301.4 R |
| 3,723,339 | 3/1973 | Wanmaker et al. | 252/301.4 R X |

FOREIGN PATENTS OR APPLICATIONS

| | | |
|---|---|---|
| 1,022,930 | 3/1966 | United Kingdom |
| 1,131,956 | 10/1968 | United Kingdom |

*Primary Examiner*—Jack Cooper
*Attorney, Agent, or Firm*—J. J. Ruch

[57] ABSTRACT

Phosphors which have a host matrix of yttrium oxide or a rare earth metal oxide and are activated by one or more rare earth metal activators are prepared by heating a mixture of salts of the host and activator metals (preferably this mixture is formed by co-precipitating the salts of the host and activator metals) at an elevated temperature in an oxygen-containing atmosphere to form the oxide phosphor, and subsequently heating the phosphor at an elevated temperature in a non-oxidizing atmosphere, which is free of halogenating agents, chalcogenating agents, or fluxes. The step of heating in a non-oxidizing atmosphere brings about a substantial increase in the X-ray speed of the phosphor, improves the stability of the phosphor to light, and increases the reflectance of the phosphor in the visible region of the spectrum. Phosphors prepared by use of this process are useful in the manufacture of X-ray intensifying screens.

14 Claims, No Drawings

PROCESS FOR PREPARING YTTRIUM OXIDE AND RARE EARTH METAL OXIDE PHOSPHORS

RELATIONSHIP TO OTHER APPLICATIONS

This application is a continuation-in-part of U.S. application Ser. No. 544,465, filed Jan. 27, 1975, which is a continuation-in-part of U.S. application Ser. No. 376,757, filed July 5, 1973, both now abandoned.

This invention relates in general to improved phosphors and in particular to yttrium oxide and rare earth metal oxide phosphors. This invention also relates to an improved process for the preparation of phosphors having a host matrix of yttrium oxide or a rare earth metal oxide which are activated by a rare earth activator. The resulting phosphor consists essentially of $Ln_{(2-x)}Z_xO_3$, wherein: Ln is selected from the group consisting of yttrium, gadolinium, and lanthanum; Z is different from Ln and is selected from the group consisting of europium, terbium, gadolinium, and dysprosium; and $x$ is between 0.0002 and 0.2. The phosphor may also contain minor amounts of other oxides which do not adversely affect the properties of the phosphor.

Phosphors in which the host matrix is yttrium oxide or a rare earth metal oxide such as lanthanum oxide or gadolinium oxide and the activator is a rare earth metal such as europium or terbium have been known for many years. These phosphors are useful in a variety of applications, such as in cathode ray tubes and in fluorescent lamps. They are typically prepared by the co-precipitation from solution of salts of the host and activator metals followed by heating of the precipitate in air at an elevated temperature to form the oxide phosphor. Most commonly, the phosphor is prepared by co-precipitating the oxalates of the host and activator metals, but the phosphors can also be prepared by coprecipitating other salts from which the oxides can be formed by heating in air, for example, such salts as hydroxides, carbonates, citrates, acetates, tartrates, and the like. Suitable conditions for preparing the oxide phosphors by coprecipitating a mixture of decomposable salts and heating in air are described in many references, for example, in U.S. Pat. Nos. 3,250,722, 3,420,861, 3,449,258, 3,449,259 and 3,484,381.

It is known that an improvement in the properties of oxide phosphors of the type described above can be obtained by heating the phosphor in contact with a flux. As described in Canadian Pat. Nos. 779,211 and 779,860, such treatment alters the shape and particle size distribution of the phosphor crystals and brings about an increase in the efficiency of the phosphor. Many materials are suitable for use as a flux, for example, borax, sodium metaborate, or metal fluorides such as lithium fluoride. However, the step of heating the oxide phosphor in the presence of a flux is disadvantageous for several reasons. Thus, for example, heating the phosphor in admixture with the flux tends to cause sintering and it ordinarily becomes necessary to break up the sintered particles in order to provide them in a form from which satisfactory coatings can be prepared. This can be accomplished by washing several times or by grinding but this involves the expense and inconvenience of additional processing steps. Moreover, because of the abrasive nature of the oxide phosphor which causes the removal of metal or other contaminants from containers and agitators or from grinding and sieving equipment, such procedures can introduce impurities into the phosphor which can result in a loss of much of the speed increase that was achieved by the treatment with the flux.

In accordance with this invention, it has been discovered that yttrium oxide and rare earth metal oxide phosphors which have improved characteristics which render them especially useful in radiography can be prepared by a process in which the step of heating a mixture of host and activator salts in an oxygen-containing atmosphere, such as air, is followed by the step of heating at an elevated temperature in a non-oxidizing atmosphere, such as an inert atmosphere or preferably a mildly reducing atmosphere. The mixture of salts is preferably formed by co-precipitation. This step of heating in a non-oxidizing atmosphere has been found to bring about an improvement in the X-ray speed of the phosphor, compared to the same phosphor which is formed by heating only in an oxidizing atmosphere. Specifically, a minimum of 15% increase in X-ray speed has been found to be produced, and higher increases are obtainable depending on the conditions. The improved process also improves the phosphor's stability to light and increases its reflectance in the visible region of the spectrum. Alternatively, satisfactory phosphors can be prepared by blending pure oxides of the host and activator or by treating the host oxide with a solution of the activator followed by firing in air and subsequently heating at an elevated temperature in a non-oxidizing atmosphere.

More specifically, in the process of this invention the oxide phosphor is heated in a non-oxidizing atmosphere which is free of halogenating agents, chalcogenating agents and fluxes. The heating is carried out at a sufficient temperature and for a sufficient period of time to bring about the desired improvement in the properties of the phosphor, such as increased X-ray speed. The non-oxidizing atmosphere may be an inert atmosphere, such as an atmosphere composed of an inert gas such as nitrogen, argon, or any of the other gases from Group Zero of the Periodic Table, as defined for example in the 40th Edition of the Chemical Rubber Publishing Co. *Handbook of Chemistry and Physics;* or a mildly reducing atmosphere, such as an atmosphere which is a mixture of hydrogen and an inert gas. Hydrogen and carbon monoxide are particularly useful as reducing agents for forming a mildly reducing atmosphere. When the atmosphere utilized is mildly reducing in nature, the temperature is maintained at a lower level than that which is ordinarily employed with an inert atmosphere; the most desirable temperature to be employed will depend on the concentration of the reducing agent in the atmosphere and the particular composition of the phosphor. Similar improvements in the properties of a particular phosphor may be obtained either by utilizing a relatively high concentration of reducing agent in the atmosphere when heating at a low temperature, or utilizing a relatively low concentration of reducing agent in the atmosphere when heating at a higher temperature. Optimum conditions for a particular phosphor composition can be determined experimentally by comparing the properties (X-ray speed, light stability, and reflectance in the visible region of the spectrum) of samples of the phosphor which have been heated under differing combinations of temperature and reducing agent concentration.

It should be noted that the method of this invention is distinguished from prior art processes in which a yttrium oxide or rare earth metal oxide phosphor is utilized as a starting material to produce a different type of phosphor, since the final product produced by the process described herein is an oxide phosphor but one which has improved properties. Thus, the heating of the oxide phosphor is carried out in an atmosphere which is free of halogenating agents, as distinguished from prior art processes in which oxide phosphors are heated in an atmosphere containing a halogenating agent, such as a hydrogen halide, in order to produce an oxyhalide phosphor. It is also carried out in an atmosphere which is free of chalcogenating agents, that is agents capable of forming sulfides, selenides or tellurides, as distinguished from prior art processes in which oxide phosphors are heated in an atmosphere containing a chalcogenating agent, such as the process of heating in an atmosphere containing hydrogen sulfide to form an oxysulfide phosphor. Heating in the nonoxidizing atmosphere is also carried out in the process of this invention in the absence of a flux and the invention thereby avoids the disadvantages involved in prior art processes in which fluxes have been employed.

The phosphors to which the method of this invention is applicable are oxide phosphors which have a host matrix of yttrium or of a rare earth metal, that is, a metal having an atomic number of from 57 to 71 in the Periodic Table of the Elements. These phosphors are activated by at least one rare earth metal activator preferably selected from the group consisting of europium, gadolinium, terbium or dysprosium. Typical examples of the phosphors which can be prepared in accordance with the process of this invention to provide substantial improvement in properties such as X-ray speed are europium-activated gadolinium oxide ($Gd_2O_3$:Eu), terbium-activated gadolinium oxide ($Gd_2O_3$:Tb), dysprosium-activated gadolinium oxide ($Gd_2O_3$:Dy), terbium-activated yttrium oxide ($Y_2O_3$:Tb), gadolinium-activated yttrium oxide ($Y_2O_3$:Gd), europium-activated lanthanum oxide ($La_2O_3$:Eu) and europium-activated yttrium oxide ($Y_2O_3$:Eu). The activator forms a small proportion of the total phosphor, typically from about 0.01 mole percent to about 10 mole percent.

In preparing oxide phosphors in accordance with this invention, a preferred procedure is to employ the double-run co-precipitation method of U.S. Pat. Nos. 3,668,143 to form a mixed oxalate of the host and activator metals. In accordance with this method, separate aqueous solutions, containing (1) oxalate anions and (2) the host and activator cations, are separately introduced into a reaction solution, an excess of up to one molar of the anions or cations is maintained in the reaction solution throughout the reaction, and local excesses of anions or cations are prevented. Reaction temperatures are preferably in the range of from about 70° C to about 100 ° c. It is preferred for the purposes of this invention to carry out the co-precipitation of the oxalates in the presence of excess oxalate ion and with at least a 0.2 molar hydrogen ion concentration in the reaction solution. The separate solutions which are added to the reaction solution preferably have a concentration of less than 1 molar and most preferably less than 0.5 molar. Optimum results are obtained if the oxalate precipitate is prepared slowly, that is, with each solution being added to the reaction solution at a rate of less than 0.1 mole per liter of reaction solution per minute. This results in the formation of large grain size oxalates which upon subsequent heating in an oxygen-containing atmosphere followed by heating in a non-oxidizing atmosphere provide oxide phosphors with desirable crystallographic structure and grain size which exhibit very high speeds.

As previously disclosed herein, the precipitate obtained by co-precipitating salts of the host and activator metals is heated in an oxygen-containing atmosphere to form the oxide phosphor. Under typical circumstances this heating step is carried out in air although other oxygen-containing atmospheres such as a mixture of oxygen and an inert gas such as argon could be used if desired. The duration of heating in the oxygen-containing atmosphere will ordinarily be in the range from about 0.5 hours to about 10 hours and more usually from about 1 to about 3 hours. Temperatures employed in this step are typically in the range from about 700° C to about 1400° C.

After formation of the oxide phosphor by the step of heating in an oxygen-containing atmosphere, it is heated in a non-oxidizing atmosphere to bring about the desired improvement in properties, such as X-ray speed. The atmosphere utilized in this step is a non-oxidizing atmosphere which is free of halogenating agents, chalcogenating agents, and fluxes. It may be an inert atmosphere, such as an atmosphere composed of nitrogen or of one of the inert gas elements such as helium, neon, or argon. Mixtures of two or more inert gases can be utilized if desired. The atmosphere can consist of the dry inert gas or of a mixture of water vapor and inert gas. As a preferred alternative to the use of an inert atmosphere, the atmosphere employed in this step can be mildly reducing in nature. A strongly reducing atmosphere, such as one using a high concentration of hydrogen at a very high temperature, is preferably avoided, as it may render the reaction difficult to control and can adversely affect the phosphor. Whether a particular combination of heating temperature and reducing agent concentration creates an undesirably strong reducing atmosphere for a particular phosphor composition can be determined. It is believed that an undesirably strong reducing atmosphere reduces the host oxide of the phosphor, thereby adversely affecting the X-ray speed of the phosphor. Therefore if the measured X-ray speed of the phosphor increases by at least about 15% after the heating step in the reducing atmosphere, the reducing atmosphere is not too strong. An example of a preferred mildly reducing atmosphere that can be employed with good results is a mixture of hydrogen and an inert gas, such as nitrogen or argon in which the hydrogen is present in a minor proportion (i.e., less than about 45% by volume and preferably from about 5 to about 35% by volume). A mildly reducing atmosphere that is especially useful can also be provided by heating the oxide phosphor in the presence of carbon, such as by placing the phosphor in a carbon boat, and providing some water vapor in the atmosphere. This results in the formation of water gas in accordance with the following reactions:

$$C + H_2O \rightleftarrows CO + H_2$$

$$CO + H_2O \rightleftarrows CO_2 + H_2$$

The mildly reducing water gas atmosphere generated by the reaction of carbon with water vapor has been found to give excellent results, especially as regards the stability to light of the resulting phosphor.

In accordance with this invention, the oxide phosphor is heated at an elevated temperature in a non-oxidizing atmosphere, free of halogenating agents, chalcogenating agents, and fluxes, under conditions of time and temperature sufficient to effect an increase in the X-ray speed of the phosphor compared to the speed prior to this step in the process. Hereafter, all increases in X-ray speed are to be understood as stated in comparison to the X-ray speed of the phosphor prior to its treatment in the non-oxidizing atmosphere.

Suitable temperatures for use in this non-oxidizing heating step are in the range from about 400° C to about 1400° C. With inert atmospheres, the preferred temperatures are in the range from about 750° C to about 1200° C and most preferably in the range from about 800° C to about 1000° C. Similarly, a particularly useful temperature range for the mildly reducing water gas atmosphere is from about 800° C to about 1000° C. With an atmosphere consisting of a mixture of hydrogen and an inert gas, particularly good results are obtained with temperatures of about 450° C to about 600° C and the optimum temperature is about 500° C. Suitable times for heating the phosphor in the non-oxidizing atmosphere will depend on the atmosphere used, the temperature, and the thickness of the phosphor layer subjected to heating, but are typically in the range from about 0.5 hour to about 8 hours and more usually from about 2 to about 4 hours. Heating of the phosphor in the non-oxidizing atmosphere does not cause sintering as occurs when phosphors are heated in contact with fluxes in accordance with the prior art. Accordingly, no grinding or similar operations are required in the proces of this invention.

The steps of heating in the oxygen-containing atmosphere and heating in the non-oxidizing atmosphere can be carried out in separate furnaces and this will ordinarily be the most convenient procedure. Alternatively, one can employ a continuous procedure in which the precipitate is passes into a two zone furnace, the first zone containing air, or other oxygen-containing atmosphere, and the second zone containing the non-oxidizing atmosphere.

While applicant does not wish to be bound by any theoretical explanation for the manner in which his invention functions, it is believed that the heating in an inert or mildly reducing atmosphere alters certain centers within the crystal which quench the luminescence and/or absorb the emitted light. Studies of the emission spectra of the phosphors with excitation by X-rays indicate that these spectra are essentially unaffected by heating in the inert or mildly reducing atmosphere except for an overall increase in intensity.

Experimental values for X-ray speeds of phosphors prepared according to the invention may be subject to variations depending on the raw materials used and on the precision with which the processing conditions are controlled. What the experimentally determined X-ray speed values set forth in the following examples do illustrate, however, is that the heating step using a non-oxidizing atmosphere increases the X-ray speed of the phosphor. The increases are particularly pronounced when a mildly reducing atmosphere is used.

EXAMPLE 1

A europium-activated gadolinium oxide phosphor having the formula $Gd_{1.96}Eu_{.04}O_3$ was prepared by use of the co-precipitation procedures described in U.S. Pat. No. 3,668,143 as follows:

A solution A was prepared by mixing 375 milliliters of 2 molar gadolinium trichloride solution, 37.5 milliliters of 0.4 molar europium trichloride solution and sufficient distilled water to make 5 liters. A solution B was prepared by mixing 1600 milliliters of 1 molar oxalic acid solution with sufficient distilled water to make 5 liters. A solution C was prepared by mixing 200 milliliters of 2 molar gadolinium trichloride solution and 20 milliliters of 0.4 molar europium trichloride solution with sufficient distilled water to make 4 liters. Solutions A and B were heated to 80° C. solution C was placed in the fluted 22 liter flask described in U.S. Pat. No. 3,668,143 and heated to 95° C. Solutions A and B were then simultaneously added to solution C at a rate of 100 milliliters of each per minute and solution C was vigorously stirred during the addition. When the addition was complete, the precipitate was allowed to settle and was washed four times by decantation with distilled water. It was then collected and dried in air at room temperature overnight. The dry precipitate was placed in a quartz tray and heated in air for 1.5 hours at a temperature of 1115° C in a muffle furnace and then rapidly cooled in air. The phosphor obtained by this procedure was placed in a metal planchet in the form of a layer with a thickness of 0.078 inch and an area of 0.76 square inches. A similar planchet was filled with a layer of a commercially available calcium tungstate phosphor. The planchets were placed close to a sheet of black and white, high-speed, pan-sensitized negative film (code 2403 Tri-X recording film manufactured by Eastman Kodak Company) and exposed to 70 kvp X-rays filtered by 0.5 millimeters of copper and 1 millimeter of aluminum. After exposure, the film was developed, stopped, fixed, washed and dried in the conventional manner. The film was also exposed through an aluminum step wedge to determine the relationship between exposure and developed density. The exposure produced by the europium-activated gadolinium oxide phosphor with excitation by the filtered 70 kvp X-rays was found to be 3.8 times that obtained with the calcium tungstate phosphor used as a control.

A ten-gram portion of the europium-activated gadolinium oxide phosphor prepared in the manner described above was placed in a glassy carbon boat and was heated for 4 hours at 825° C in a tube furnace with 1.6 cubic feet per hour of nitrogen and 2 cubic feet per hour of argon passing through the tube. Before entering the furnace, the gas stream passed through a 500-milliliter capacity gas bubbler filled with distilled water. At the end of the heating period, the sample was rapidly cooled to room temperature in the atmosphere within the furnace. The exposure with excitation by the filtered 70 kvp X-rays was measured and was found to be 4.6 times that obtained with the calcium tungstate control and, thus, approximately 20 percent greater than that obtained with the phosphor prior to heating it in the atmosphere of argon and nitrogen. A second ten-gram portion of the phosphor was heated for 2 hours at 925° C under the same argon-nitrogen atmosphere and the exposure produced was 4.94 times that obtained by the control, giving a speed increase of about 30 percent compared to the untreated phosphor. A third ten-gram portion of the phosphor was heated in the same manner in a Corning Vycor boat for 3 hours at 825° C and the exposure produced was 4.37 times that of the control, giving an increase in X-ray speed of about 15 percent. Similar results were obtained by heating the phosphor in the carbon boat in a dry atmosphere of argon and nitrogen, that is, with use of a bubbler being omitted. However, when the phosphor was heated in the Vycor boat with air passing through the bubbler in place of the mixture of argon and nitrogen, no improvement in the speed of the phosphor was obtained. A fourth ten-gram sample of the phosphor was placed in a quartz boat inside the carbon boat and heated for 3 hours at 825° C with the mixture of argon and nitrogen passing through the water and a 30 percent increase in speed was obtained.

Planchets containing samples of the phosphors prepared in the manner described above were placed a distance of 54 inches from two fluorescent lamps and exposed for 30 minutes to a radiant flux of 70 microwatts per square centimeter. As a result of this exposure, the X-ray speed of the europium-activated gadolinium oxide phosphors which had not been heated in a non-oxidizing atmosphere decreased by 25–29 percent. The speed of the phosphor heated in contact with carbon in a dry inert gas atmosphere decreased by 15 percent, while the speed of the phosphor heated in the absence of carbon in an atmosphere of inert gas and water vapor decreased by 10 percent and the speed of the phosphors heated with carbon in an atmosphere of inert gas and water vapor did not decrease at all. Thus, the stability of the phosphor to light is best when it is heated in the mildly reducing atmosphere generated by reaction of carbon with water vapor.

All gas flow rates specified in these examples were measured at standard temperature and pressure and all speeds were determined as indicated in Example 1.

EXAMPLE 2

A terbium-activated gadolinium oxide phosphor having the formula $Gd_{1.998}Tb_{.002}O_3$ was prepared in a manner similar to that described in Example 1. In preparing this phosphor, a solution A was prepared by mixing 375 milliliters of 2 molar gadolinium trichloride solution, 2 milliliters of 0.4 molar terbium trichloride solution, and 125 milliliters of 37.5 percent hydrochloric acid with sufficient distilled water to make 5 liters of solution. A solution B was prepared by mixing 1125 milliliters of 1 molar oxalic acid with sufficient distilled water to make 5 liters. A solution C was prepared by mixing 100 milliliters of 1 molar oxalic acid and sufficient distilled water to make 4 liters. Solutions A and B were heated to 70° C. Solution C was placed in the fluted 22-liter flask and heated to 95° C. After adding 81.5 milliliters of 37.5 percent hydrochloric acid to solution C, solutions A and B were simultaneously added to solution C at a rate of 250 milliliters of each per minute. Solution C was vigorously stirred during the additions. When the addition was complete, the precipitate was allowed to settle and was washed four times by decantation with distilled water. It was then collected and dried in air at room temperature overnight. The dry precipitate was placed in a quartz tray and heated in air for 1.5 hours at a temperature of 1115° C. The resulting $Gd_2O_3$:Tb phosphor was rapidly cooled in air and the X-ray speed was determined in the same manner as in Example 1. The exposure was found to be one third of that produced by the calcium tungstate control. When ten grams of this phosphor was placed in a carbon boat and heated for 4 hours at 825° C in a tube furnace through which wet nitrogen and argon were passed under the conditions specified in Example 1, the exposure produced was found to be 6 times greater than that of the untreated phosphor. This constitutes an increase in X-ray speed of about 500%. A second ten-gram portion of the phosphor was placed in a Corning Vycor boat and heated for 2 hours at 500° C with 1.6 cubic feet per hour of hydrogen and 2 cubic feet per hour of argon passing through the bubbler and the treatment was found to increase the speed by a factor of five times. This constitutes an increase in X-ray speed of about 400%.

EXAMPLE 3

A dysprosium-activated gadolinium oxide phosphor having the formula $Gd_{1.92}Dy_{.08}O_3$ was prepared in a manner similar to that described in Example 1. In preparing this phosphor, a solution A was prepared by mixing 1 liter of 0.3 molar gadolinium trichloride solution, 3 milliliters of 0.4 molar dysprosium trichloride solution and 49 milliliters of 37.5 percent hydrochloric acid with sufficient distilled water to make 2 liters. A solution B was prepared by mixing 450 milliliters of 1 molar oxalic acid solution with sufficient distilled water to make 2 liters. A solution C was prepared by mixing 75 milliliters of 1 molar oxalic acid with sufficient distilled water to make 4 liters. Solution C was placed in the fluted 22 liter flask and heated to 95° C. Then 81.5 milliliters of 37.5 percent hydrochloric acid was added and solutions A and B were simultaneously added to solution C at a rate of 100 milliliters of each per minute. Solution C was vigorously stirred during the addition. When the addition was complete, the precipitate was allowed to settle, washed four times by decantation with distilled water, collected and dried in air at room temperature. The dry precipitate was placed in a quartz tray and heated in air for 1.5 hours at a temperature of 1115° C. The resulting $Gd_2O_3$:Dy phosphor was rapidly cooled in air and the X-ray speed was determined in the same manner as in Example 1. The exposure was found to be 0.8 times that obtained with the calcium tungstate control. When ten grams of this phosphor was placed in a Vycor boat and heated for 2 hours at 500° C in the tube furnace used in Example 1 with 1.6 cubic feet per hour of hydrogen and 2 cubic feet of argon passing through the bubbler, the speed was found to be twice that of the untreated phosphor. This constitutes an increase in X-ray speed of about 100%. The same improvement in X-ray speed was obtained when the phosphor was heated at 825° C for 4 hours in a glassy carbon boat with 1.6 cubic feet per hour of nitrogen and 2 cubic feet per hour of argon passing through the bubbler. Similar results were also obtained with a dry atmosphere of argon and nitrogen.

EXAMPLE 4

A terbium-activated yttrium oxide phosphor having the formula $Y_{1.92}Tb_{.08}O_3$ was prepared in a manner similar to that described in Example 1. In preparing this phosphor, a solution A was prepared by mixing 1 liter of 0.3 molar yttrium trichloride solution, 30 milliliters of 0.4 molar terbium trichloride solution, and 49 milliliters of 37.5 percent hydrochloric acid in sufficient distilled water to make 2 liters. A solution B was prepared by mixing 450 milliliters of 1 molar oxalic acid with sufficient distilled water to make 2 liters. A solution C was prepared by mixing 75 milliliters of 1 molar oxalic acid with sufficient distilled water to make 4 liters. Solution C was placed in the fluted 22 liter flask and heated to 95° C. Then 81.5 milliliters of 37.5 percent hydrochloric acid was added and solutions A and B were simultaneously added to solution C at a rate of 100 milliliters of each per minute. Solution C was vigorously stirred during the addition. When the addition was complete, the precipitate was allowed to settle, washed four times by decantation with distilled water, collected and dried in air at room temperature. The dry precipitate was placed in a quartz tray and heated in air for 1 hour and 20 minutes at a temperature of 1000° C. The resulting $Y_2O_3$:Tb phosphor was cooled in air and the X-ray speed was determined in the same manner as in Example 1. The speed was found to be 1/25 that of the calcium tungstate control. When ten grams of this phosphor was placed in a Vycor boat and heated for 2 hours at 500° C in the tube furnace used in Example 1 with 1.6 cubic feet per hour of hydrogen and 2 cubic feet per hour of nitrogen passing through the tube (the gases used were dry as the bubbler was not employed), the X-ray speed of the phosphor was found to be increased by about 480%.

EXAMPLE 5

A gadolinium-activated yttrium oxide phosphor having the formula $Y_{1.99}Gd_{.01}O_3$ was prepared in a manner similar to that described in Example 1. In preparing this phospher, a solution A was prepared by mixing 1 liter of 0.3 molar yttrium trichloride solution, 4 milliliters of 0.4 molar gadolinium trichloride solution, and 49 milliliters of 37.5 percent hydrochloric acid in sufficient distilled water to make 2 liters. A solution B was prepared by mixing 450 milliliters of 1 molar oxalic acid with sufficient distilled water to make 2 liters. A solution C was prepared by mixing 75 milliliters of 1 of molar oxalic acid with sufficient distilled water to make 4 liters. Solution C was placed in the fluted 22-liter flask and heated to 95° C. Then 81.5 milliliters of 37.5 percent hydrochloric acid was added and solutions A and B were simultaneously added to solution C at a rate of 100 milliliters of each per minute. Solution C was vigorously stirred during the addition. When the addition was complete, the precipitate was allowed to settle, washed four times by decantation with distilled water, collected and dried in air at room temperature. The dry precipitate was placed in a quartz tray and heated in air for 1 hour and 20 minutes at a temperature of 1000° C. The resulting $Y_2O_3$:Gd phosphor was cooled in air and the X-ray speed was determined in the same manner as in Example 1. The speed was found to be 0.23 times that of the calcium tungstate control. When ten grams of this phosphor was placed in a carbon boat and heated for 4 hours at 825° C in the tube furnace used in Example 1 with 2.0 cubic feet per hour of argon and 1.6 cubic feet per hour of nitrogen passing through the bubbler, the X-ray speed of the phosphor was found to be increased by about 60%.

EXAMPLE 6

A europium-activated lanthanum oxide phosphor having the formula $La_{1.96}Eu_{.04}O_3$ was prepared in a manner similar to that described in Example 1. In preparing this phosphor, a solution A was prepared by mixing 375 milliliters of 2 molar lanthanum trichloride solution and 37.5 mulliliters of 0.4 molar europium trichloride solution with sufficient distilled water to make 5 liters. A solution B was prepared by mixing 1600 milliliters of 1 molar oxalic acid and sufficient distilled water to make 5 liters. A solution C was prepared by mixing 200 milliliters of 2 molar lanthanum trichloride solution and 20 milliliters of 0.4 molar europium trichloride solution with sufficient distilled water to make 4 liters. Solutions A and B were heated to 80° C. Solution C was placed in the fluted 22-liter flask and heated to 95° C. Solutions A and B were then simultaneously added to solution C at a rate of 100 milliliters of each per minute. Solution C was vigorously stirred during the addition. When the addition was complete, the precipitate was allowed to settle, washed four times by decantation with distilled water, collected and dried in air at room temperature overnight. The dry precipitate was placed in a quartz tray and heated in air for 1 ½ hours at a temperature of 1115° C. The resulting $La_2O_3$:Eu phosphor was cooled in air and the X-ray speed was determined in a similar manner to that described in Example 1. The exposure produced was found to be 1.15 times that of the calcium tungstate control. When ten grams of this phosphor was placed in a carbon boat and heated for 3 hours at 925° C in the tube furnace used in Example 1 with 2.0 cubic feet per hour of argon and 1.6 cubic feet per hour of nitrogen passing through the water in the bubbler, the exposure produced by the phosphor was found to be 1.35 times that of the calcium tungstate control. This constitutes an increase in X-ray speed of about 17%. The reflectance spectrum of the $La_2O_3$:Eu phosphor, both before and after the heat treatment in the inert atmosphere was compared with the reflectance spectrum of Eastman White Reflectance Standard barium sulfate. This comparison indicated that heating the phosphor in the inert atmosphere increased the reflectance substantially in the region of wavelengths between 325 and 700 nanometers.

EXAMPLE 7

A europium-activated yttrium oxide phosphor having the formula $Y_{1.96}Eu_{.04}O_3$ was prepared in a manner similar to that described in Example 1. In preparing this phosphor, a solution A was prepared by mixing 375 milliliters of 2 molar yttrium trichloride solution and 37.5 milliliters of 0.4 molar europium trichloride solution with sufficient distilled water to make 5 liters. A solution B was prepared by mixing 1600 milliliters of 1 molar oxalic acid with sufficient distilled water to make 5 liters. A solution C was prepared by mixing 200 milliliters of 2 molar yttrium trichloride solution and 20 milliliters of 0.4 molar europium trichloride solution with sufficient distilled water to make 4 liters. Solutions A and B were heated to 80° C. Solution C was placed in the fluted 22-liter flask and heated to 95° C. Solutions A and B were then simultaneously added to solution C at a rate of 100 milliliters of each per minute. Solution C was vigorously stirred during the addition. When the addition was complete, the precipitate was allowed to settle, washed four times by decantation with distilled water, collected and dried in air at room temperature overnight. The dry precipitate was placed in a quartz tray and heated in air for 1 ½ hours at a temperature of 1115° C. The resulting $Y_2O_3$ :Eu phosphor was cooled in air and the X-ray speed was determined in a similar manner to that described in Example 1. The exposure produced was found to be 1.6 times that of the calcium tungstate control. When ten grams of this phosphor was placed in a carbon boat and heated for 3 hours at 925° C in the tube furnace used in Example 1 with 2.0 cubic feet per hour of argon and 1.6 cubic feet per hour of nitrogen passing through the water in the bubbler, the exposure produced by the phosphor was found to be 1.9 times that of the calcium tungstate control. This constitutes an increase in X-ray speed of about 19%. Measurement of the reflectance spectrum of this phosphor in the same manner as in Example 6 showed that the heat treatment in an inert atmosphere brought about substantial improvement in the reflectance between 325 and 750 nanometers.

EXAMPLE 8

A dysprosium-activated gadolinium oxide phosphor having the formula $Gd_{1.996}Dy_{.004}O_3$ was prepared in a manner similar to that described in Example 1. In preparing this phosphor, a solution A was prepared by mixing 750 milliliters of 1 molar gadolinium trichloride and 4 milliliters of 0.4 molar dysprosium trichloride with 125 milliliters of 37.5 percent hydrochloric acid solution and sufficient distilled water to make 5 liters. A solution B was prepared by mixing 1125 milliliters of 1 molar oxalic acid solution with sufficient distilled water to make 5 liters. A solution C was prepared by mixing 100 milliliters of 1 molar oxalic acid with sufficient distilled water to make 4 liters. Solutions A and B were heated to 70° C. Solution C was placed in the fluted 22-liter flask and heated to 95° C. Then 81.5 milliliters of 37.5 percent hydrochloric acid was added to solution C followed by simultaneous addition of solutions A and B at a rate of 100 milliliters of each per minute. Solution C was vigorously stirred during the addition. When the addition was complete, the precipitate was allowed to settle, washed four times by decantation with distilled water, collected and dried in air at room temperature overnight. The dry precipitate was placed in a quartz tray and heated in air for 1 ½ hours at a temperature of 1115° C. The resulting $Gd_2O_3$:Dy phosphor was cooled in air and the X-ray speed was determined in a similar manner to that described in Example 1. The exposure produced was found to be equal to that of the calcium tungstate control. When 20 grams of this phosphor was placed in a carbon boat and heated for 3 hours at 925° C in the tube furnace used in Example 1 with 2.0 cubic feet per hour of argon and 1.6 cubic feet per hour of nitrogen passing through the water in the bubbler, the exposure produced by the phosphor was found to be 2.3 times that of the calcium tungstate control. This constitutes an increase in X-ray speed of about 130%. Measurement of the reflectance spectrum of this phosphor in the same manner as in Example 6 showed that the heat treatment in an inert atmosphere brought about substantial improvement in the reflectance between 320 and 750 nanometers.

EXAMPLE 9

Thirty-four grams of 99.99 percent gadolinium oxide was thoroughly mixed with 9.4 milliliters of 0.4 milliliters of 0.4 M europium trichloride (99.9 percent) in a glass mortar, then dried at 100° C. After drying, the mixture was ground and ignited for 1 ½ hours at 1115° C. After ignition, the phosphor was tested in the manner described in Example 2 and the speed was measured in the manner described in Example 2, with the exception that the film was developed for 12 minutes in Kodak Developer D-19 at 75° F. The exposure produced by this europium-activated gadolinium oxide phosphor, having the formula $Gd_{1.96}Eu_{.04}O_3$, with the excitation by filtered 70 kvp X-rays, was about 1.02 X that produced by the commercial calcium tungstate phosphor.

Fifteen grams of the gadolinium oxide phosphor was placed in the glassy carbon boat and ignited in wet argon and nitrogen at 925° C for 2 hours (gas flow rates were 2.0 and 1.6 cfh, respectively, measured with flow meters calibrated with air). After cooling in the inert atmosphere, the sample was removed and the speed was measured as decribed before. This measurement showed that the speed had increased to 1.51 X that produced by the commercial calcium tungstate phosphor, producing an increase in X-ray speed of about 49%.

Fifteen grams of the gadolinium oxide phosphor was placed in a Corning Vycor boat and heated in hydrogen and argon for 2 hours at 500° C (gas flow rates were 1.6 and 2.0 cfh, respectively). The phosphor was then cooled in an inert atmosphere and the speed was measured as described before. This measurement showed that the speed had increased to 1.65 X that produced by the commercial calcium tungstate phosphor, giving an increase in X-ray speed of about 63%.

Finally, fiften grams of the phosphor was ignited in a quartz boat in air for 2 hours at 1100° C. Again, the speed was about 1.0 X that produced by the commercial calcium tungstate.

Exposure of these phosphor samples to the light from two fluorescent lamps in the manner described before decreased the speed of the sample that had been ignited in air to a value that was 0.64 X that of the commercial calcium tungstate, but had little or no effect on the speed of samples that had been heated in the inert or reducing atmosphere.

EXAMPLE 10

This example again illustrates the increases in X-ray speed that result from the use of a heating step with a non-oxidizing atmosphere, and the particularly beneficial increases that result when the non-oxidizing atmosphere is a mildly reducing atmosphere. The example further illustrates that minor amounts of other oxides may be present without adversely affecting the increases in X-ray speed that result from the invention, and that use of higher firing temperature in the first heating step (oxygen containing atmosphere) enhances the increases in X-ray speed obtained in the firing in the non-oxidizing atmosphere.

A solution (A) was prepared by mixing 1 liter of 0.6 M yttrium trichloride, 60 ml of 0.4 M terbium trichloride, and 98 ml of 37.5 percent hydrochloric acid with sufficient distilled water to make 4 liters. A second solution (B) was prepared by mixing 900 ml of 1 M oxalic acid with sufficient distilled water to make 4 liters. A third solution (C) was prepared by mixing 150 ml of 1 M oxalic acid and 163 ml of 37.5 percent hydrochloric acid with sufficient distilled water to make 8 liters. The purity of the yttrium and terbium oxides with respect to other rare earth oxides was 99.99 and 99.99 percent, respectively, and the other constituents of the solutions were Reagent Grade. Solution (C) was heated to 95° C and Solutions (A) and (B) were heated to 70° C. Solution (C) was then vigorously agitated while Solutions (A) and (B) were added simultaneously at a rate of 67 ml/min. The yttrium terbium oxalate precipitate was washed with distilled water, then collected, dried in air, and fired at 1000° C in air for one hour. The procedure was repeated and the $Y_2O_3$:Tb was blended to provide sufficient material for the following experiments.

Three mixtures with the following composition were prepared: $Y_2O_3$:Tb, 53.7 g and MgO (Reagent Grade), 0.5 g; $Y_2O_3$:Tb, 53.7 g, and $Al_2O_3$(99.99 percent), 1.27 g; and $Y_2O_3$:Tb, 53.7 g, and $B_2O_3$ (Ventron Ultra Pure Crystal), 0.87 g. Each mixture was placed in an aluminum oxide crucible, covered, and heated in air to 1000° C for three hours. A portion of the of the $Y_2O_3$:Tb without any addition was also processed in the same way. A similar set of examples was heated in air to 1400° C for 3½ hours. At the conclusion of this procedure, there were eight samples; four prepared at 1000° C and four at 1400° C.

Each of the eight samples was separated into four portions. The first portion was not treated further. The second was placed in a quartz boat in a quartz tube furnace and heated to 500° C with 2.6 cubic feet per hour of hydrogen and 3.0 cubic feet per hour (cfh) of nitrogen flowing through the tube for two hours. At the end of this treatment, the sample was cooled in an atmosphere of nitrogen to room temperature before removing it from the quartz tube. The third portion was heated in the same boat and tube furnace to 500° C for two hours with only 4.0 cfh of nitrogen flowing through the tube. It was then cooled in nitrogen to room temperature as before. The fourth portion was heated in the same boat and tube furnace to 800 ° C for two hours with 4.0 cfh of nitrogen flowing through the tube. It was then cooled in nitrogen to room temperature as before.

The resulting 32 samples and a sample of commercial calcium tungstate (DuPont No. 501) were placed in metal planchets. Then the planchets were placed close to a sheet of black-and-white, high-speed, pan-sensitized negative film (KODAK TRI-X Recording Film, Code 2403, manufactured by Eastman Kodak company) and exposed to 70 kVp X-rays filtered by 0.5 mm of copper and 1 mm of aluminum. After exposure, the film was developed, stopped, fixed, washed, and dried in the conventional manner. The film was also exposed through an aluminum step wedge to determine the relationship between exposure and developed density. the exposure produced by the terbium-activated phosphors with excitation by the filtered 70 kVp X-rays was compared with that produced by the calcium tungstate phosphor (speed = 100) and the results are summarized in Table I below.

improved radiographic sharpness without excessive mottle. The intensifying screens can be prepared in accordance with the usual practice in the art by dispersing the phosphor in a suitable binder, such as a copolymer of acrylic acid and an alkyl acrylate, a vinyl chloride polymer, polyvinyl butyral, a polycarbonate resin, and the like, and coating it on a suitable support such as a polyester film, or layers without binder can be used. Good results are obtained with a phosphor to binder ratio on a weight basis of from about 4:1 to about 30:1 and more preferably from about 10:1 to about 20:1 and with a phosphor coverage in the range of from about 15 to about 120 grams per square foot of screen and more preferably from about 30 to about 60 grams per square foot of screen.

An especially useful radiographic system employing the oxide phosphors prepared by the process of this invention consists of two intensifying screens, each having a coating of the phosphor dispersed in a binder, used in combination with a double-coated spectrally sensitized film that contains enough dye or other absorbing material to make the exposure of the back emulsion layer of the film less than 30 percent of the total exposure of both emulsion layers when the film is exposed to X-rays with only a single screen in contact with the front emulsion layer. In this combination, the high density of the phosphor improves the definition of the image that is produced and this improvement in definition is not obtained at the expense of system speed or mottle because the phosphor has high efficiency of fluorescence when excited by X-rays and for this reason relatively slow films with good physical characteristics and low granularity can be used.

The invention has been described in detail with particular reference to certain preferred embodiments thereof, but it will be understood that variations and modifications can be effected within the spirit and scope of the invention.

What is claimed is:

Table I

| Sample Description | Air Fired at (° C) | Speed After Air | $H_2 + N_2$ at 500° C | | $N_2$ at 500° C | | $N_2$ at 800° C | |
|---|---|---|---|---|---|---|---|---|
| | | | Speed | % Increase | Speed | % Increase | Speed | % Increase |
| $Y_2O_3$: Tb with MgO | 1000 | 6.5 | 56 | 761 | 15 | 130 | 22.5 | 246 |
| | 1400 | 7.6 | 145 | 1807 | 12.5 | 64 | 16.5 | 117 |
| $Y_2O_3$: Tb with $Al_2O_3$ | 1000 | 6.5 | 69 | 961 | 19.5 | 200 | 26 | 300 |
| | 1400 | 13.0 | 155 | 1092 | 29.5 | 126 | 79 | 507 |
| $Y_2O_3$: Tb with $B_2O_3$ | 1000 | 9.1 | 120 | 1218 | 23 | 152 | 51 | 460 |
| | 1400 | 11.7 | 170 | 1352 | 23.5 | 100 | 85 | 626 |
| $Y_2O_3$: Tb | 1000 | 7.1 | 71 | 900 | 21 | 195 | 29.5 | 315 |
| | 1400 | 9.8 | 141 | 1338 | 52.5 | 435 | 66 | 573 |

Oxide phosphors prepared in accordance with the method of this invention find utility in a number of fields, for example, in cathode ray tubes for television applications and in fluorescent lamps. However, they are especially useful in the preparation of intensifying screens for use in radiography. Because of their high X-ray speed, they make it possible to decrease the speed and granularity of the radiographic film that is used to record the image. The intensifying screens can be used in film-screen combinations in which the film is double-coated or coated on only one side. The high speed of the phosphor also permits the use of absorbing layers to provide cross-over control in double-coated films without excessive loss in system speed. These phosphors are also advantageous in intensifying screens because of their high density, typically in excess of 6 grams per cubic centimeter, which aids in providing 1. A process of preparing a phosphor having improved x-ray speed which consists essentially of an oxide of an element selected from the group consisting of yttrium, gadolinium, and lanthanum, activated by at least one different rare earth metal activator selected from the group consisting of europium, terbium, gadolinium, and dysprosium, comprising:

heating a mixture of salts of said element and said activator in an oxygen-containing atmosphere to form said phosphor; and in a subsequent heating step heating said phosphor in a hydrogen-containing mildly reducing atmosphere at an elevated temperature and for a period of time which are sufficient to effect an increase in the X-ray speed of said phosphor, compared to the speed without such subsequent heating step, of at least about 15%.

2. A process as described in claim 1 wherein said phosphor is europium-activated gadolinium oxide.

3. A process as described in claim 1 wherein said phosphor is terbium-activated gadolinium oxide.

4. A process as described in claim 1 wherein said phosphor is dysprosium-activated gadolinium oxide.

5. A process as described in claim 1 wherein said phosphor is terbium-activated yttrium oxide.

6. A process as described in claim 1 wherein said phosphor is gadolinium-activated yttrium oxide.

7. A process as described in claim 1 wherein said reducing atmosphere consists essentially of a mixture of hydrogen and an inert gas.

8. A process as described in claim 1 wherein said reducing atmosphere consists essentially of an inert gas, water vapor, carbon monoxide, hydrogen, and carbon dioxide.

9. A process as described in claim 1 wherein said reducing atmosphere is provided by heating the oxide phosphor in the presence of carbon, inert gas, and water vapor.

10. A process as described in claim 9 wherein the phosphor is heated in said reducing atmosphere for a period of about 2 to about 4 hours at a temperature of about 800° C to about 1000° C.

11. A process of preparing a phosphor having improved X-ray speed which consists essentially of an oxide of an element selected from the group consisting of yttrium, gadolinium, and lanthanum, activated by at least one different rare earth metal activator selected from the group consisting of europium, terbium, gadolinium, and dysprosium, comprising:
heating a mixture of salts of said element and said activator in an oxygen-containing atmosphere to form said phosphor; and in a subsequent heating step
heating said phosphor in a mildly reducing atmosphere, comprising from about 5% to about 35% by volume hydrogen and from about 65% to about 95% by volume of an inert gas, at an elevated temperature and for a period of time which are sufficient to effect an increase in the X-ray speed of said phosphor, compared to the speed without such subsequent heating step, of at least about 15%.

12. A process as described in claim 11 wherein the step of subsequently heating the phosphor in an atmosphere of hydrogen and an inert gas is for a period of about 2 hours to about 4 hours and is at a temperature of about 450° C to about 600° C.

13. A process of preparing a phosphor having improved X-ray speed of the formula $Ln_{(2-x)}Z_xO_3$,
wherein Ln is selected from the group consisting of yttrium, gadolinium, and lanthanum,
Z is different from Ln and is selected from the group consisting of europium, terbium, gadolinium, and dysprosium, and
$x$ is between 0.0002 and 0.2,
comprising:
heating a mixture of salts of Ln and Z in an oxygen-containing atmosphere to form the phosphor; and in a subsequent heating step,
heating said phosphor in an atmosphere of hydrogen and an inert gas for a period of about 2 hours to about 4 hours at a temperature of about 450° C to about 600° C, sufficient to effect an increase in the X-ray speed of said phosphor, compared to the speed without such subsequent heating step, of at least about 15%.

14. A process of preparing a phosphor having improved x-ray speed which consists essentially of an oxide of an element selected from the group consisting of yttrium, gadolinium, and lanthanum, activated by at least one different rare earth metal activator selected from the group consisting of europium, terbium, gadolinium, and dysprosium, comprising:
heating a mixture of salts of said element and said activator in an oxygen-containing atmosphere to form said phosphor; and in a subsequent heating step
heating said phosphor in a hydrogen-containing mildly reducing atmosphere at a temperature of from about 400° C to about 1400° C for a period of time of about 0.5 to about 8.0 hours, sufficient to effect an increase in the x-ray speed of said phosphor, compared to the speed without such subsequent heating step, of at least about 15%.

* * * * *

UNITED STATES PATENT AND TRADEMARK OFFICE
CERTIFICATE OF CORRECTION

PATENT NO. : 4,032,471                               Page 1 of 2

DATED : June 28, 1977

INVENTOR(S) : George W. Luckey

It is certified that error appears in the above-identified patent and that said Letters Patent are hereby corrected as shown below:

Title page, column 1, item [56], under UNITED STATES PATENTS, line 4, "3,682,823" should read --3,682,833--.

Column 3, line 45, "Nos." should read --No.--; line 55, "c." should read --C.--.

Column 5, line 29, "proces" should read --process--; line 35, "passes" should read --passed--.

Column 6, line 7, "solution C" should read --Solution C--.

Column 7, line 48, "additions" should read --addition--.

Column 9, line 20, "phospher" should read --phosphor--; line 27, "of" (2nd occurrence) should be deleted; line 57, "mulliliters" should read --milliliters--.

Column 10, line 21, after "atmosphere" --,-- should be inserted.

Column 11, lines 49-50, "0.4 milliliters of" should be deleted.

UNITED STATES PATENT AND TRADEMARK OFFICE
CERTIFICATE OF CORRECTION

PATENT NO. : 4,032,471
DATED : June 28, 1977
INVENTOR(S) : George W. Luckey

It is certified that error appears in the above-identified patent and that said Letters Patent are hereby corrected as shown below:

Column 12, line 50, "99.99" (2nd occurrence) should read --99.9--.

Column 13, lines 28-29, "company" should read --Company--; line 35, "the exposure" should read --The exposure--.

Signed and Sealed this

Fourteenth Day of February 1978

[SEAL]

*Attest:*

RUTH C. MASON
*Attesting Officer*

LUTRELLE F. PARKER
*Acting Commissioner of Patents and Trademarks*